United States Patent [19]

Frank et al.

[11] 4,430,110

[45] Feb. 7, 1984

[54] SHAPING SHEETS OF GLASS OR OTHER DEFORMABLE MATERIAL TO A COMPOUND CURVATURE

[75] Inventors: Robert G. Frank, Murrysville; George R. Claassen, New Kensington; John J. Ewing, Tarentum; Michael T. Fecik, Pittsburgh, all of Pa.

[73] Assignee: PPG Industries, Inc., Pittsburgh, Pa.

[21] Appl. No.: 402,670

[22] Filed: Jul. 28, 1982

[51] Int. Cl.³ .......................................... C03B 23/035
[52] U.S. Cl. ...................................... 65/104; 65/106; 65/107; 65/273; 65/287
[58] Field of Search ............... 65/104, 273, 106, 287, 65/107, 288

[56] References Cited

U.S. PATENT DOCUMENTS

| | | | |
|---|---|---|---|
| 4,197,108 | 4/1980 | Frank et al. | 65/273 |
| 4,272,274 | 6/1981 | Frank et al. | 65/273 |
| 4,277,276 | 7/1981 | Kellar et al. | 65/106 |
| 4,297,118 | 10/1981 | Kellar et al. | 65/104 |
| 4,349,375 | 9/1982 | Kellar et al. | 65/106 X |

*Primary Examiner*—Arthur D. Kellogg
*Attorney, Agent, or Firm*—Edward I. Mates

[57] ABSTRACT

This invention concerns shaping sheets of glass or other deformable material to compound shapes. A sheet having a desired transverse component of curvature engages the downward facing surface of a deformable vacuum mold having a lower transversely curved wall and is held thereagainst by vacuum while still hot enough to be distorted as the vacuum mold deforms to apply the longitudinal bending component to the sheet to be shaped.

11 Claims, 15 Drawing Figures

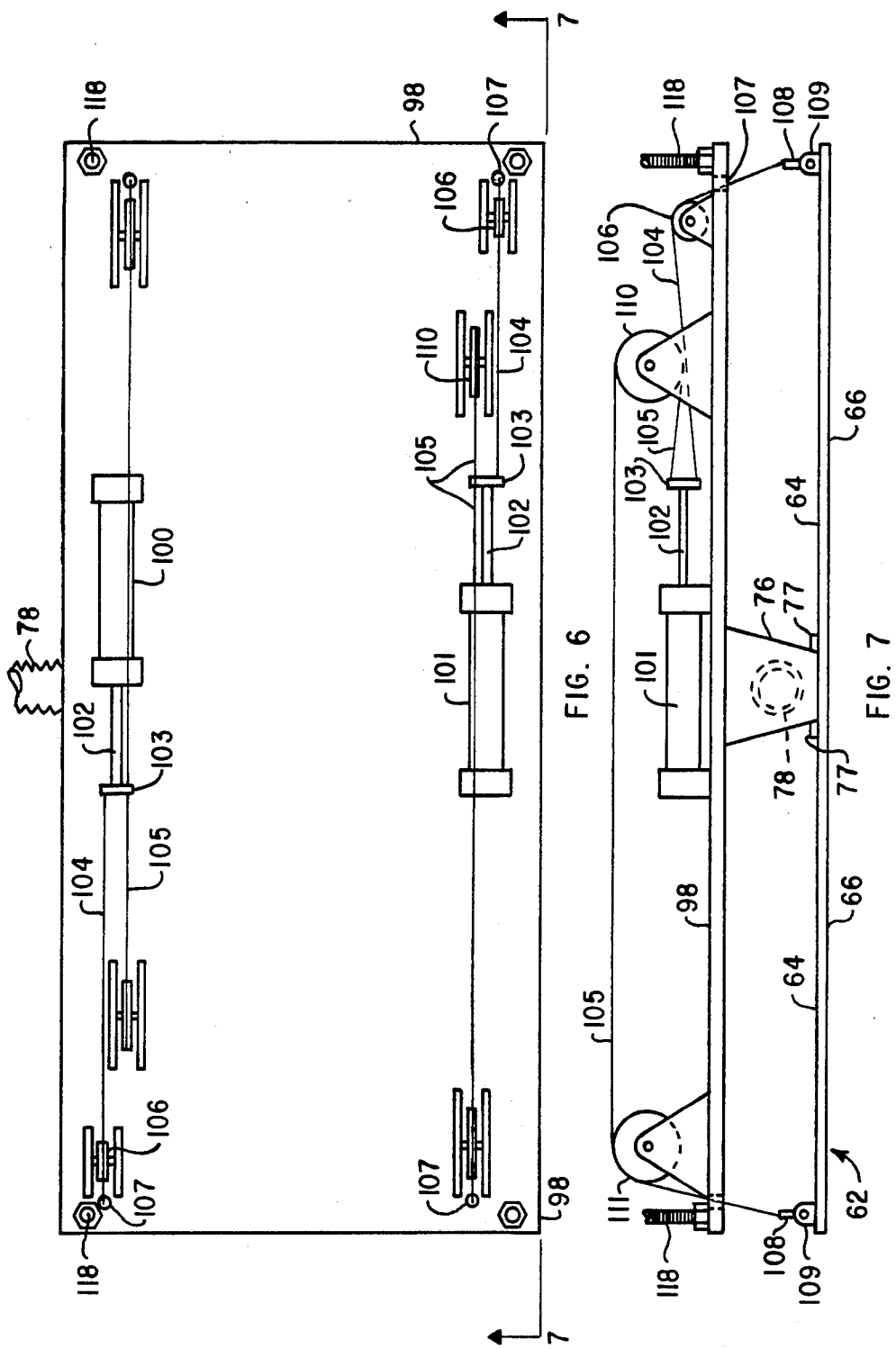

SHAPING SHEETS OF GLASS OR OTHER DEFORMABLE MATERIAL TO A COMPOUND CURVATURE

BACKGROUND OF THE INVENTION

1. Field of the Invention

The present invention relates to the shaping of sheets of deformable materials such as glass. More particularly, the present invention relates to the shaping of glass sheets to a compound bend while in contact with a deformable vacuum mold.

2. Description of Patents of Interest

U.S. Pat. No. 4,277,276 and U.S. Pat. No. 4,297,118, both to John D. Kellar and Gordon F. Pereman, disclose the bending of glass sheets while supported in engagement against a vacuum mold. In these patents, a flat glass sheet is brought into engagement against a lower wall of a vacuum mold that is apertured so that air can be sucked in through the apertures of the lower wall to hold a flat glass sheet in engagement against the lower wall. Means is provided to deform the vacuum mold and shape its lower wall to a shape corresponding to that desired for a bent glass sheet. The glass sheet is softened sufficiently prior to its vacuum engagement against the lower wall of the vacuum mold so that when the mold deforms, the sheet supported thereagainst by vacuum also deforms.

U.S. Pat. Nos. 4,197,108 and 4,272,274 to Frank et al disclose apparatus for bending glass sheets into cylindrical bends wherein glass sheets are conveyed into a shaping station on conveyor rolls and are lifted on a grooved shaping mold having a plurality of spaced elongated shaping members extending completely across a dimension of the shaping apparatus. The shaping members are separated by grooves that extend completely across the dimension of the mold, so that when the grooved shaping mold is lifted from a position beneath the conveyor to a position above the conveyor, the lifted glass sheet immediately above the mold sags by gravity to conform to the shape of the elongated shaping areas between the continuous elongated grooved portions. The glass is lifted into vacuum engagement against a downwardly facing wall of an upper vacuum mold having a downwardly facing wall of desired configuration, the lower lifting mold is lowered to below the level of the conveyor rolls and a ring-like member is transported into the shaping station below the upper vacuum mold and above the conveyor rolls to enable the shaped glass sheet to be transferred by releasing the vacuum that supports the bent glass sheet against the lower wall of the upper vacuum mold. Preferably, the upper vacuum mold is moved vertically to a position near the conveyor rolls initially to minimize the lifting required for the lower mold, and then the vacuum mold is lifted while the lifting mold is lowered after the upper vacuum mold engages the rising glass sheet by vacuum.

In both types of apparatus described previously, the glass has been limited in its shaping to a relatively easy to accomplish shape about one axis of curvature. The need for more complicated shapes made it necessary for the glass sheet bending art to improve on the apparatus existing at the time of the present invention.

SUMMARY OF THE INVENTION

The present invention comprises a vacuum mold having a rigid transverse curvature conforming approximately to that desired for a glass sheet bent to a compound curvature. The vacuum mold has the capability of remaining relatively rigid in its transverse dimension and capable of deformation along its longitudinal dimension between a flat and curved longitudinal bending component. The glass-facing surface of the vacuum mold is relaxed when it defines a flat longitudinal component and stressed when deformed to a curved longitudinal component.

A glass sheet arriving at an elevated temperature suitable for shaping at the shaping station is shaped to a transverse component of curvature and then is engaged by vacuum when in close adjacency to the lower transversely curved wall of the vacuum mold when the latter is in its relaxed state. A glass sheet, on engaging the vacuum mold with its lower wall shaped in one direction to the curved transverse dimension of the vacuum mold has the one component of the compound shape but extends in essentially straight line elements in the direction to be shaped to conform to the other component of the desired compound bend. After the glass sheet bent about one axis of curvature is brought into close proximity to the lower transversely curved wall of the vacuum mold, vacuum is continued to hold the hot glass sheet against the relaxed vacuum mold. The vacuum mold is then distorted along its longitudinal dimension while maintaining the vacuum so that the heat-softened glass sheet follows the changing shape of the mold in a manner similar to that provided for shaping flat sheets by the distortable vacuum molds of the prior art. The result is the obtention of glass sheets having compound shapes not previously obtainable with distortable prior art vacuum molds.

In a preferred embodiment of the present invention, the transversely curved, longitudinally distortable vacuum mold is used with a slotted lifting mold that moves vertically between a lowered position beneath the sheet support surface of a sheet transporting roll conveyor and a position above the rolls of the roll conveyor so that the lifting mold develops a transverse component of bend in the glass before the hot glass sheet engages said deformable vacuum mold.

The method for bending a glass sheet into a compound shape according to a specific embodiment of this invention comprises conveying glass sheets on conveyor rolls into a shaping station where the leading glass sheet is lifted on the upper shaping surface of a slotted lifting mold having slots between elongated shaping members of transverse curvature to move the shaping members to a position above the support plane defined by the conveyor rolls into a close relation to the upper vacuum mold having a rigid curved configuration along one dimension conforming to the curved configuration of the lower lifting mold. The vacuum mold is then distorted along its opposite dimension extending normal to the rigidly curved dimension with the glass sheet engaged thereagainst by vacuum so that the glass sheet initially curved to the curvature conforming to the curvature along the one dimension of the vacuum mold develops a curved component transverse to the first curved dimension thereof. As the glass is engaged by vacuum against the distorting vacuum mold, the latter is lifted and the glass sheet, having been transported through a furnace en route to the shaping station, is still sufficiently soft to be shaped by deformation as the vacuum mold is deformed.

According to a specific embodiment of the present invention, which may be combined with the main features of the present invention just described, a ring-like member having an outline conforming to that desired for the shaped glass sheet is delivered to a position below the vacuum mold and the glass sheet is released from vacuum support and is dropped onto the outline ring-like member for transport from the shaping station to a cooling station where the glass sheet is chilled as rapidly as is necessary to impart a desired degree of temper in the glass.

The benefits of the present invention will be understood more clearly in the light of a description of a specific embodiment that follows. The term "glass" is used for convenience only and is intended to cover any deformable, transparent material.

BRIEF DESCRIPTION OF THE DRAWINGS

In the drawings that form part of a description of an illustrative embodiment,

FIG. 6 is a plan view of a rigid support plate that supports means for deforming the deformable vacuum wall of the vacuum mold along its longitudinal dimension;

FIG. 7 is a side view transverse to that of FIG. 6 taken along the line 7—7 of FIG. 6;

DESCRIPTION OF A PREFERRED EMBODIMENT

Figure 1:
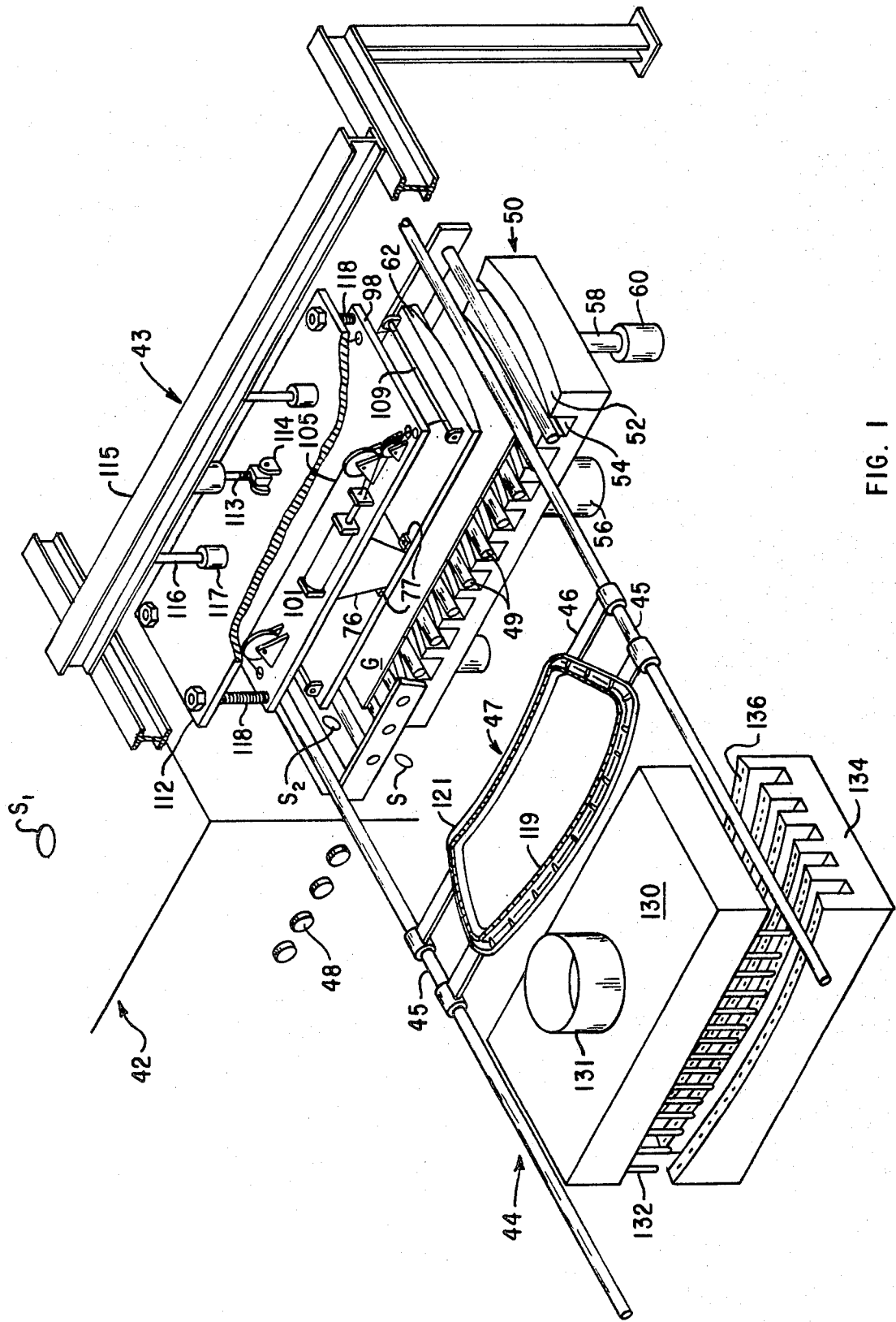
FIG. 1 is a perspective view of apparatus for shaping and tempering glass sheets that incorporates a preferred embodiment of the present invention comprising a shaping station having a vacuum mold having a rigid transverse shape and a deformable longitudinal shape shown in combination with a lower, slotted lifting mold and a roller type conveyor for transporting glass sheets into the shaping station.
Figure 2:
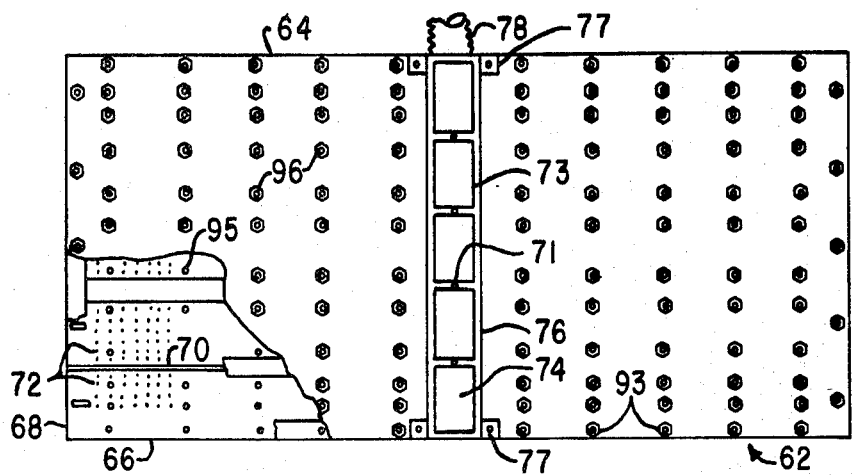
FIG. 2 is a plan view taken from above an upper wall member of the vacuum mold with part broken away to show other parts of the vacuum mold in greater detail.

Referring now to FIG. 1 of the drawings, an apparatus for heating and shaping sheets of material, such as glass, includes a heating means such as a tunnel-like furnace 42, the exit end of which is shown, a shaping station 43 located immediately beyond the exit of the furnace 42 and a cooling station 44 located to one side of the shaping station 43. The apparatus also includes a pair of transversely extending rails 45 which are used to transport a carriage 46 to which is attached a sheet transfer means 47 between the shaping station 43 and the cooling station 44.

Heat may be supplied in the furnace 42 by hot gases from gas burners or by electric radiant heating elements or by a combination of both. These heat supply means are well known in the art and need not be described in further detail at this stage of the development of the art.

The side walls of the furnace support bearing housings for a roller-type conveyor comprising longitudinally spaced, transversely extending conveyor rolls 48 that define a horizontal path of travel which extends through the furnace 42. Additional conveyor rolls 49 are located at the shaping station 43 to form a continuation of the path of travel of rolls 48 beyond the furnace 42. The rolls of the conveyor are arranged in sections and their rotational speed controlled through clutches in a manner well known in the art so that the speed of the different conveyor sections may be controlled and synchronized. A glass sheet sensing element S1 is located a short distance upstream of the shaping station 43 to actuate a high speed runout of conveyor rolls 48 near the furnace exit. A second sensing element S2 is located just beyond the furnace exit to initiate a cycle of operation of this apparatus.

Limit switches or electronic controllers or other timing devices may be provided to synchronize the operation of the various elements of the apparatus according to a predetermined sequence. Since their arrangement and manner of operation are not part of this invention, they will not be described in detail herein.

A lifting mold 50 comprising a plurality of transversely extending shaping members 52 spaced by transversely extending slots 54 is actuated for vertical movement by a lower piston 56 and controlled in its vertical movement by vertical guides 58 mounted in sleeves 60. Both the shaping members 52 and the slots 54 extend across the entire transverse dimension of the lifting mold 50.

The conveyor rolls 48 and 49 extend across the transverse dimension of the conveyor so as to support the entire transverse dimension of a glass sheet G along closely spaced lines of rolling support to maintain a desired degree of flatness in the glass sheet on its arrival at the shaping station 43. The transverse slots 54 extend across the entire width dimension of the lifting mold 50 and are of a size sufficient to have clearance for moving the elongated transversely extending shaping members 52 from a recessed position to an elevated position where the conveyor rolls 49 are within the transversely extending slots 54.

The glass sheets are supported across their entire width first on conveyor rolls 48 during their passage through the furnace and then on conveyor rolls 49 as they enter the shaping station 43. When the lifting mold 50 is raised, the glass sheet is lifted from conveyor rolls 49 and sags onto the shaping members 52.

Directly above the lifting mold 50 is a vacuum mold 62. The latter comprises an upper flexible sheet 64 and a lower flexile sheet 66 coextensive in area, with flexible spacer means 68 coextensive in length and slightly narrower than the flexible sheets 64 and 66 (although it may be coextensive in area therewith) interposed between the two sheets 64 and 66. The lower flexible sheet 66 is rolled to define a transverse curve about its longitudinal axis and provided with longitudinal slots 70 at each longitudinal end thereof to facilitate its flexibility about its longitudinal axis, a transverse row of round apertures 71 spaced across the central region of the sheet, and a plurality of small apertures 72 spaced throughout the extent of the lower flexible sheet 66. The upper flexible sheet 64 is provided with apertures 71 corresponding to each aperture 71 of lower sheet 66. The apertures 71 extend through spacers 73 between rectangular openings 74 which communicate with a plenum chamber 76 (see FIG. 1) which leads to a flexible conduit 78. The latter communicates with a source of vacuum, but, if desired, may be adapted for coupling to a pressurized source when desired. Tabs 77 are provided for the plenum chamber 76 to connect the plenum to the upper surface of upper flexible sheet 64.

The flexible spacer means 68 comprises a plurality of rectangular, flexible, openwork plates 80 coextensive in length with those of flexible sheets 64 and 66, additional flexible plates of intermediate width 82 and coextensive in length with plates 80 and whose sides are offset laterally inward of the plates 80, and relatively narrow flexible openwork plates 84 coextensive in length with plates 80 and 82. The narrow plates 84 are transversely aligned with the transverse center portions of flexible openwork plates 80 and 82. The widest plates 80 are disposed in the portion adjacent the upper flexible sheet 64. The intermediate width plates 82 are in spaced relation between the upper and lower flexible sheets 64 and 66 and the narrow plates 84 are located adjacent lower flexible sheet 66, respectively.

Each of the rectangular, flexible, openwork plates 80, 82 and 84 comprises a pair of cross slats 86 at each longitudinal end thereof. The cross slats 86 are aligned at each longitudinal end of the vacuum mold 60 and are interconnected by at least a pair of transversely spaced, flexible, longitudinal slats of the narrow plates 84 and the central longitudinal slats of the openwork plates 82 of intermediate width and the central longitudinal slats of the wide openwork plates 80. The central longitudinal slats 87 are flanked by flanking longitudinal slats 88 that are found in both the openwork plates of intermediate width 82 and widest openwork plates 80. The widest openwork plates 80 are provided with laterally outer longitudinal slats 89 having outer sides slightly inboard of the corresponding longitudinal side edges of the upper flexible sheet 64 and the lower flexible sheet 66. Longitudinal slats 87, 88 and 89 have round apertures 71 aligned with the corresponding apertures 71 of the upper flexible sheet 64 and the lower flexible sheet 66 to secure the longitudinal slats to the upper and lower flexible sheets 64 and 66 in their longitudinal center portions. The longitudinal slats 87, 88 and 89 are aligned over the longitudinal slots 70 to avoid any leak in the vacuum mold 62.

The wide, flexible openwork plates 80 are adjacent the upper flexible sheet 64 of the vacuum mold 62 and the narrow flexible openwork plates 84 are adjacent the lower flexible sheet 66 of the vacuum mold with the openwork plates 82 of intermediate width disposed between the plates 80 and 84 so that the width of the plates narrows in the direction from the upper flexible sheet 64 to the lower flexible sheet 66. Furthermore, all the cross slats 86 are in alignment with one another and in alignment with the longitudinal end portions of the upper flexible sheet 64 and the lower flexible sheet 66. The central longitudinal slats 87 of the widest open work plates 80 and the plates 82 of intermediate width are aligned with one another and with the corresponding longitudinal slats 87 of the narrowest plates 84. The flanking longitudinal slats 88 of the widest flexible openwork plates 80 are aligned with the flanking longitudinal slats 88 of the openwork plates of intermediate width 82. There are no slats of the narrow plates corresponding to the flanking slats 88. Furthermore, only the upper wide flexible open work plates 80 have outer longitudinal slats 89 aligned with one another.

Figure 3:
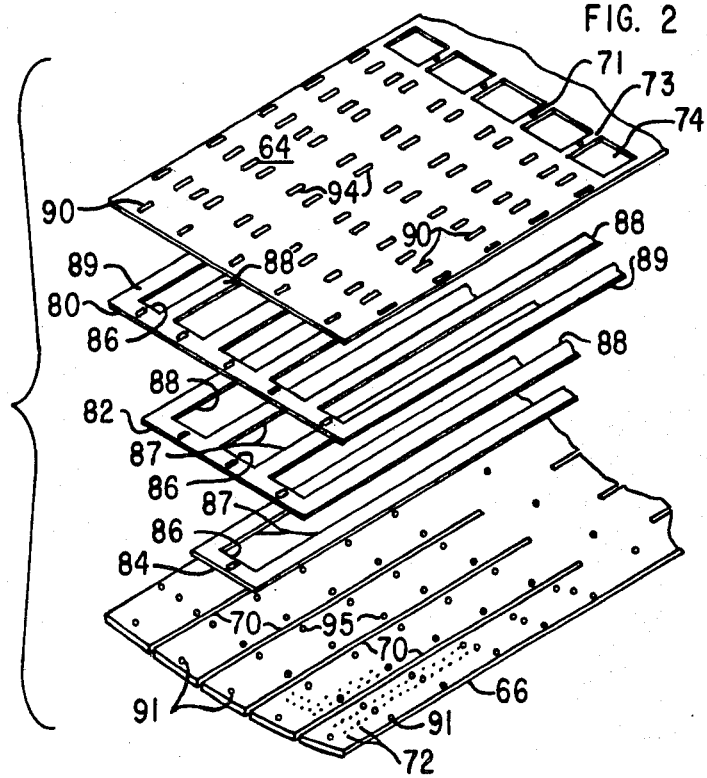
FIG. 3 is an exploded perspective view of a portion of the vacuum mold showing the arrangement of certain representative structural elements forming part of the vacuum mold.
Figure 4:
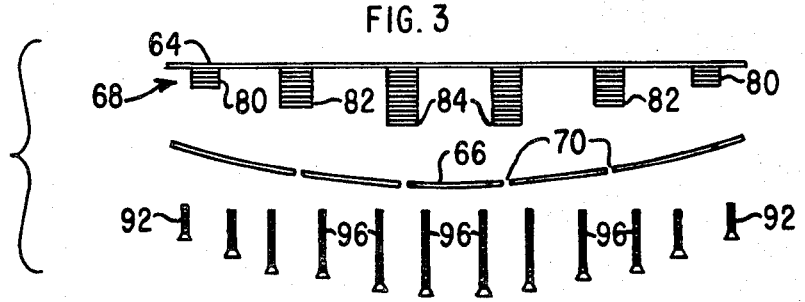
FIG. 4 is an exploded transverse view of certain elements of the vacuum mold of the present invention.
Figure 5:
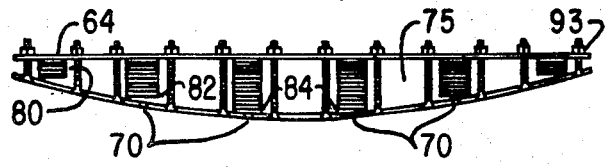
FIG. 5 is a transverse sectional view of the vacuum mold of the present invention with the structural elements thereof interconnected to show how the mold obtains a rigid transverse shape.

FIG. 3 shows only one openwork plate 80, one openwork plate 82 and one openwork plate 84. However, as is seen in FIGS. 4 and 5, several openwork plates of each size are provided and only one of each size shown in the exploded perspective view for ease in understanding the construction.

A plurality of apertures 90 elongated in a direction of the length of the flexible sheets 64 and 66 is provided around the marginal portions of the upper flexible sheet 64 and the cross slats 86. Aligned therewith are corresponding round apertures 91 provided in the lower flexible sheet 66. The round apertures 91 have tapered openings to receive perimeter attachment bolts 92. The latter have enlarged heads which are received in the tapered openings around the perimeter of the lower flexible sheet 66. Lock nuts 93 secure the perimeter attachment bolts 92 so as to clamp the lower surface of the upper flexible sheet 64 against the upper surface of the uppermost wide flexible openwork plate 80 and force the lower flexible sheet 66 against the lower surface of the lowest of the outer longitudinal slats 89 of the flanking longitudinal slats 88 and of the central longitudinal slats 87 to force the lower flexible sheet 66 to maintain its rolled shape with a transverse configuration about the longitudinal axis of the box that is of convex, downwardly facing configuration.

The upper flexible sheet 64 is provided with intermediate elongated openings 94 and the lower flexible sheet 66 is provided with aligned intermediate round openings 95. Intermediate attachment means 96 in the form of nuts and bolts interconnects the upper flexible sheet 64 and the lower flexible sheet 66 through openings 94 and 95 in flanking relation to each of the longitudinal slats 87, 88 and 89 to insure that the flexible openwork plates 80, 82 and 84 remain transversely aligned with one another, even when deformation of the vacuum mold 62 causes the slats to slide relative to one another.

The material of which the upper and lower flexible sheets 64 and 66 are composed is mild steel. The flexible sheets 64 and 66 are either $\frac{1}{8}$ inch (3.2 millimeters) thick or 1/16 inch (1.6 millimeters) thick, while the openwork plates 80, 82 and 84 are all 1/16 inch (1.6 millimeters) thick in preferred embodiments.

The aligned longitudinal slats 87, 88 and 89, when clamped together, divide the vacuum mold 62 into a plurality of elongated chambers 75 (FIG. 5), one for each of the rectangular openings 74 in the upper flexible sheet 64. This enables the individual elongated chambers to communicate with either a source of vacuum or a pressurized source through the plenum chamber 76 as needed during the operation to be described later.

Referring to FIGS. 6 and 7, a reinforcement plate 98 is disclosed spaced from the upper flexible sheet 64 of the vacuum mold 62 in their central portions by plenum chamber 76 which is shown in FIG. 7 to be of an inverted keystone shape in cross section. The area of the reinforcement plate approximates the area of the deformable vacuum mold 62.

The reinforcement plate 98 supports a pair of piston cylinders 100 and 101 extending longitudinally in opposite directions on each side of its longitudinal center line. Each piston is provided with a piston rod 102. Only one of the piston cylinders and its associated structure will be described because the cylinders operate identically in opposite directions.

The outer end of each piston rod 102 contains a cross bar 103 to which are attached a pair of cables 104 and 105. The cable 104 is entrained about a pulley 106 and extends therefrom obliquely downward and longitudinally outward through an opening 107 in the reinforcement plate 98 onto a bracket 108 attached to one side of a reinforcement bar 109. The latter extends transversely near one longitudinal end of and is fixed to the upper flexible sheet 64 of the vacuum mold 62.

The other cable 105 from cross bar 103 is mounted around a reversing pulley 110 and continues around a second pulley 111 and extends therefrom obliquely downward and longitudinally outward through another opening 107 in the reinforcement plate 98 toward a second bracket 108 to which it is attached. The second bracket 108 is attached to another reinforcement bar 109 which extends transversely and is fixed to the upper flexible sheet 64 adjacent its opposite longitudinal end from the first longitudinal end mentioned previously. It is thus seen that, when the pistons in cylinders 100 and 101 operate in unison to retract cross bars 103, that the reinforcement bars 109 are caused to lift upward and inward toward the respective pulleys 106 and 111 and cause the vacuum mold 62 to be deformed on each longitudinal side of its central portion. The vacuum mold 62 supported in its central portion beneath the inverted keystone shape of the plenum chamber 76 resists deformation in its central portion and is deformed equally on both sides of a transverse axis passing across the longitudinal center of the vacuum mold 62.

If it is desired to have the vacuum mold 62 deform into a shape that varies from a symmetrical shape about its longitudinal center, cam guides of the type depicted in U.S. Pat. No. 4,277,276 (not shown) of the desired shape can be attached to the bottom surface of the reinforcement plate 98 to guide the shaping of the upper flexible sheet 64 of the vacuum mold into conformity therewith as the pistons in piston cylinders 100 and 101 are actuated. When the pistons are extended as shown in FIGS. 6 and 7, the vacuum mold resumes its unstressed flat lengthwise configuration wherein the upper flexible sheet 64 is flat transversely and both flexible sheets 64 and 66 are flat longitudinally. The lower flexible sheet 66 transversely curved without stress due to its manner of fabrication is forced to conform to the longitudinal shape applied by deformation to the upper flexible sheet 64.

The reinforcement plate 98 is rigidly connected in spaced relation to a mounting plate 112. The latter moves in unison with the reinforcement plate 98 and the vacuum mold 62 in response to actuation by an upper piston 113. The latter is connected through a flexible coupling 114 at its lower end to the reinforcement plate and its housing is attached rigidly at its upper end to an overhead support 115. Vertical posts 116 extend upward from sleeves 117 fixed to the mounting plate 112 to guide the mounting plate 112, the reinforcement plate 98 and the deformable vacuum mold box 62 for movement in a vertical direction. Externally threaded bolts 118 extend upward from each corner of the reinforcement plate 98 to the mounting plate 112 to attach the plates in vertically spaced relation as seen in FIG. 1.

The sheet transfer means 47 comprises a ring-like member 119 conforming in elevation and plan outline to the shape desired immediately inward of the peripheral edge of a glass sheet to be shaped at the shaping station 43. The ring-like member 119 is surrounded by a pipe-type reinforcement 121 suitably interconnected thereto. The ring-like member has an upper edge surface that is notched or serrated to minimize contact with the glass and preferably is constructed in the manner of U.S. Pat. No. 3,973,943 to Samuel L. Seymour, the disclosure of which is incorporated herein by reference. The pipe-type reinforcement 121 is connected to the carriage 46 which is constructed to move along the length of the transfer rails 45 between a position immediately beneath the vacuum mold 62 and above the lifting mold 50 when the latter is recessed and a position within the cooling station 44.

The cooling station 44 comprises an upper plenum 130 connected to an air supply duct 131 which delivers air under pressure from a source of tempering medium (not shown) to said upper plenum 130 for delivery through downwardly directed pipe nozzles 132 toward the upper surface of a glass sheet when the latter is supported on said ring-like member 119. Additional tempering medium supply means communicates with a lower plenum 134 which is provided with upwardly directed bar-type nozzles 136 for supplying the tempering medium, such as pressurized air, against the lower surface of a glass sheet supported on said ring-like member 119 between nozzles 132 and 136. Further details of a typical cooling station can be found in U.S. Pat. No. 4,225,333 of Robert G. Frank, the disclosure of which is incorporated herein by reference. It is understood that while the combination of downwardly directed pipe nozzles 132 extending downward from the upper plenum 130 and upwardly directed bar-type nozzles 136 extending upward from the lower plenum 134 is incorporated in the embodiment described herein, that other arrangements such as having pipe nozzles in both directions, can also be used.

Cycle of Operation

A plurality of glass sheets is conveyed through the furnace 42 while supported on the rotating furnace rolls 48. When a glass sheet is sensed by sensing element S1, the rolls 48 in the exit section of furnace 42 accelerate. When the glass sheet passes sensing element S2, the apparatus elements of the illustrative embodiment are in positions ready to begin a shaping cycle.

Figure 8:
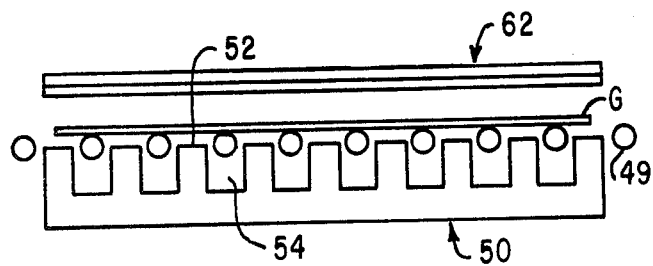
FIG. 8 is a longitudinal view showing the arrangement of certain shaping elements of the present invention at the shaping station during a first stage of a shaping cycle according to the present invention.
Figure 9:
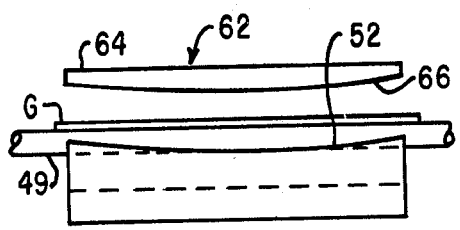
FIG. 9 is a view transverse to FIG. 8 showing the relation of the glass sheet to various structural elements of the present invention at the shaping station during the first stage of the shaping cycle.

The sensing element S1 controls a high speed run out section which incorporates certain furnace conveyor rolls 48 and sensing element S2 controls the rotation of the additional conveyor rolls 49 in the shaping station 43 to have the rolls 49 stop with the glass sheet in position immediately above the lifting mold 50. The piston 56 is in its downwardly retracted position when the sheet arrives at shaping station 43, while the upper piston 113 supports the vacuum mold 62 so that its lower flexible sheet 66 in its longitudinally unstressed configuration is a short distance above the plane of flat glass support defined by the common upper tangent for conveyor rolls 49. It is understood that the lower flexible sheet 66 is distorted transversely to provide a permanent transverse shape throughout the bending operation. FIGS. 8 and 9 show how the lifting mold 50 is located beneath the conveyor rolls 49 and the longitudinally unstressed vacuum mold 62 is arranged in spaced relation slightly above the flat glass sheet G to provide clearance for the latter to enter the shaping station 43 at the start of a shaping cycle.

Figure 10:
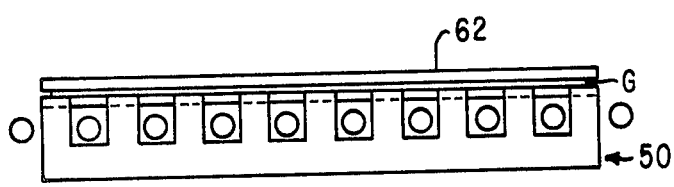
FIG. 10 is a view similar to FIG. 8 showing the relation of the glass sheet to the structural elements at a second stage of the shaping cycle.
Figure 11:
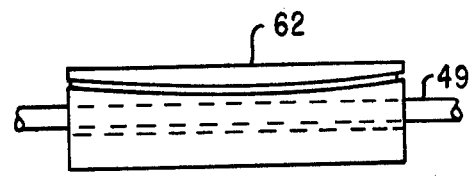
FIG. 11 is a view transverse to FIG. 10 taken simultaneously with the view of Fig. 10.

In FIGS. 10 and 11, the second step of the shaping operation is shown. The glass sheet G has been lifted by the lifting mold 50 so that it is supported completely above the support plane provided by the conveyor rolls 49 and has sagged to a transversely curved configuration. At this part of the shaping cycle, vacuum is applied to the elongated chambers 75 within the vacuum mold 62 so that the glass sheet G which has been sagged to conform transversely to the transverse curvature of the transversely extending shaping members 52 of the lifting mold 50 is now engaged by vacuum against the lower transversely curved flexible sheet 66 of the vacuum mold of conforming transverse curvature.

Figure 12:
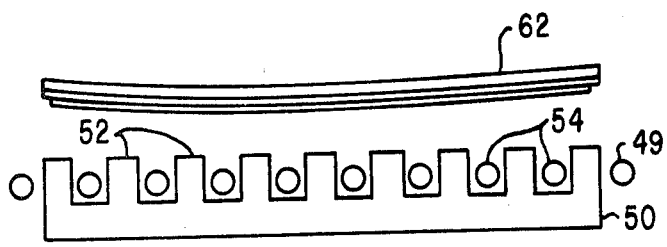
FIG. 12 is a view similar to FIGS. 8 and 10 showing the relation of the glass sheet to the structural elements at the shaping station during a third stage of the shaping cycle.
Figure 13:
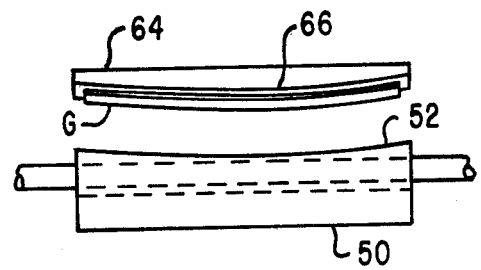
FIG. 13 is a view transverse to that of FIG. 12 and taken simultaneously therewith.
Figure 14:
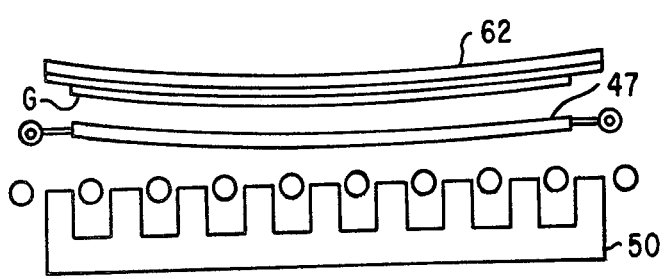
FIG. 14 is a view similar to FIGS. 8, 10, and 12 showing the relation of various structural elements of the apparatus at the shaping station during a still later stage of the shaping cycle.
Figure 15:
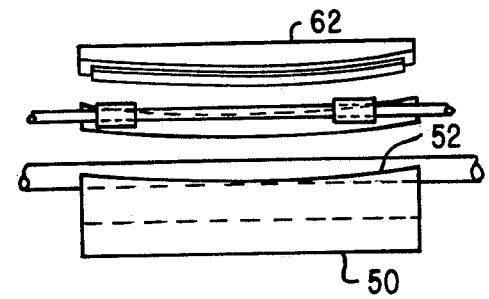
FIG. 15 is a view taken simultaneously with the view of FIG. 14 and transversely thereto.

Subsequently, the vacuum mold 62 is distorted longitudinally about its transverse axis by actuating the piston rods 102 in piston cylinders 100 and 101 while upper piston 113 lifts the vacuum mold 62. The vacuum holding the glass sheet against the lower surface of the lower flexible sheet 66 is maintained and, simultaneously, the lifting mold 50 begins to retract. These features are shown in FIGS. 12 and 13. When the vacuum mold 62 is lifted fully upward and the lifting mold 50 has been fully retracted downwardly as depicted in FIGS. 14 and 15, the sheet transfer means 47 is able to enter the space between the lifted vacuum mold 62 and the lowered lifting mold 50.

The vacuum is then discontinued so that the glass sheet G drops onto the sheet transfer means 47 to have its perimeter conform to the peripheral shape of the ring-like member 119 of the transfer means. The transfer means then supports the shaped glass sheet now shaped to a compound shape about two axes of bending for moving into the cooling station 44 where the glass sheet supported on the transfer means 47 is reciprocated while cold tempering medium, such as cold air blasts under pressure, are applied against the upper and lower surfaces of the supported glass sheet to impart a desired degree of temper. The sheet transfer means is then unloaded to remove the tempered glass sheet and, if time allows, the transfer means is returned to a parking station in the vicinity of the shaping station 43 to await the completion of the next bending cycle. The piston rods 102 and piston cylinders 100 and 101 are actuated to relieve the stress applied to the flexible vacuum mold 62 to enable the vacuum mold to assume a straight flat position along its longitudinal dimension. The upper piston 113 is extended to lower the vacuum mold into its position depicted in FIGS. 8 and 9 to await the arrival of the next glass sheet at the shaping station 43.

The apparatus is now ready for another operation.

The present invention makes possible the shaping of glass sheets to compound shapes by utilizing a vacuum mold that has a rigid lower shaping surface transversely curved in elevation to conform substantially to the upward facing surface of the lifting mold to impart a simple curve about one axis of curvature followed by distorting the vacuum mold along its longitudinal dimension to impart the other component of curvature. While the terms "transverse" and "longitudinal" have been used herein, it is understood that either a longer or a shorter dimension may be formed during the lifting of the glass sheet on a first lifting mold and the second shape transverse to the first shape may be imparted as the vacuum mold to which the glass sheet has been transferred changes shape.

Typical parts produced on apparatus conforming to this invention are backlights having transverse cylindrical components of bend having depths of bend ranging from less than $\frac{1}{2}$ inch (1.27 centimeters) to more than one inch (2.54 centimeters) for widths of more than 28 inches (71 centimeters) to less than 14 inches (36 centimeters) and longitudinal components of bend having depths of bend ranging from less than $\frac{1}{2}$ inch (1.27 centimeters) to more than 3 inches (7.62 centimeters) over a longitudinal dimension ranging from less than 45 inches (114 centimeters) to more than 60 inches (152 centimeters).

The form of the invention shown and described in this disclosure represents an illustrative preferred embodiment thereof. It is understood that the gist of the invention is defined in the claimed subject matter which follows and that various modifications of this invention which become obvious in the light of a reading of the description of this specification are incorporated therein.

What is claimed is:

1. A deformable mold for use in shaping sheets composed of glass or other deformable material to a compound shape comprising a first bend component about a first axis and a second bend component about a second axis transverse to said first axis comprising means adapted to connect said mold to a source of vacuum, an upper flexible sheet of fluid-impervious material, an apertured lower flexible sheet of fluid-impervious material, flexible spacer means between said upper flexible sheet and said lower flexible sheet constructed and arranged to hold said lower flexible sheet with a convex downward configuration in elevation about the first axis of said mold and in an essentially flat plane about said second axis when said flexible sheets are clamped together in unstressed relation along a common dimension, and means to distort said mold about its second axis from a flat configuration to a desired curved configuration so that when vacuum is applied to said mold a hot sheet of deformable hot material is held against said apertured, lower flexible sheet by vacuum and when said mold is deformed with vacuum applied, said hot sheet is deformed in engagement with said deforming mold.

2. A deformable mold as in claim 1, wherein said upper flexible sheet is flat in both longitudinal and transverse dimensions when unstressed and said lower flexible sheet is curved transversely and flat longitudinally in its unstressed state.

3. A deformable mold as in claim 2, wherein said flexible spacer means comprises a plurality of openwork plates of thin flexible material interposed between said upper flexible sheet and said lower flexible sheet, said plates composed of a material capable of sliding relative to said other plates and said upper and lower flexible sheets over a wide range of temperatures ranging from room temperature to the softening point of said deformable material, said openwork plates comprising at least one first plate of frame-like configuration approximately coextensive in outline with said flexible sheets adjacent said upper flexible sheet and at least one other plate of frame-like configuration coextensive in length but narrower in width than said first plate adjacent said lower flexible sheet, said openwork plates being arranged in generally decreasing width from adjacent said upper flexible sheet to adjacent said lower flexible sheet, attachment means extending through said upper flexible sheet, said lower flexible sheet and clamping said openwork plates therebetween to define a peripheral enclosure wall for said flexible mold, said openwork plates being free to slide longitudinally relative to one another and to said upper and lower flexible sheets when said deformable mold is distorted about its transverse axis, thereby avoiding distortion of said lower flexible sheet from a desired transverse shape when said mold is distorted.

4. A deformable mold as in claim 3, wherein each of said openwork plates comprises a plurality of flexible longitudinal slats spaced transversely of one another, said flexible longitudinal slats being aligned with corresponding flexible longitudinal slats of other of said openwork plates to form flexible elongated walls separating a plurality of elongated chambers within said deformable mold, and means interconnecting said upper flexible sheet to said lower flexible sheet in flanking relation to said aligned flexible longitudinal slats to maintain said slats in transverse alignment with one another as they slide longitudinally relative to one another during said distortion.

5. A deformable mold as in claim 3, further including a rigid plate, a plenum chamber connecting said rigid plate to the central transverse portion of said upper flexible sheet to provide space between the remainder of said deformable mold flanking said plenum chamber along its longitudinal axis and the remainder of said rigid plate, actuating means carried by said rigid plate, means connected between said actuating means and a pair of opposite ends of said upper flexible sheet to distort the opposite ends of said vacuum mold about an axis transverse to said longitudinal axis on actuation of said actuating means.

6. In combination with the deformable mold of claim 2, a lifting mold having an upper surface curved transversely to conform to the transverse shape of said lower flexible sheet.

7. In combination with said deformable mold and lifting mold of claim 6, a roller conveyor having longitudinally spaced, transversely extending rolls extending across the transverse dimension of said roller conveyor to support the entire transverse dimension of a hot sheet conveyed thereon, said lifting mold comprising a plurality of elongated shaping members extending continuously across the entire transverse dimension of said lifting mold to support the entire transverse dimension of said hot sheet after shaping, and a transversely extending slot between each pair of adjacent of said elongated shaping members, said slots having dimensions sufficient to provide clearance to lift said lifting mold to an elevated position wherein the upper surfaces of said elongated shaping members are sufficiently high to support the entire transverse dimension of said hot sheet above said conveyor rolls, and means to provide relative motion vertically of said lifting mold relative to said roller conveyor between a lower position where the lifting mold is below the support surface provided by said roller conveyor and an upper position where the upper surface of said lifting mold is above said support surface.

8. In the combination as in claim 7, further including a cooling station and sheet transfer means movable into a position beneath said deformable mold when said lifting mold is lowered into a position below said conveyor rolls within said shaping station.

9. A method of shaping a sheet of deformable material to a compound curvature comprising a longitudinal bend component about a transverse axis and a transverse bend component about a longitudinal axis comprising engaging said sheet while it is hot enough to be deformed and while it is shaped transversely about its longitudinal axis to said transverse bend component with a deformable vacuum mold having a transversely curved configuration conforming to that of said sheet undergoing shaping by vacuum, and while holding said hot deformable sheet against said deformable mold by vacuum, distorting said mold about its transverse axis into a shape approximating said longitudinal bend component while said sheet is still hot enough to be deformed, whereby said sheet develops a compound bend comprising said longitudinal bend component and a transverse bend component.

10. The method as in claim 9, further including releasing said shaped sheet from engagement with said deformed vacuum mold and dropping said shaped sheet onto a ring-like member having an outline shape conforming to that desired for the shaped sheet and delivering said shaped sheet while supported on said ring-like member to a cooling station for exposure to cold tempering medium.

11. The method as in claim 9 or claim 10, wherein said sheet to be shaped obtains its transverse component of shape by lifting said sheet while hot enough to be deformed on an upper curved surface of a lifting mold, said upper curved surface conforming to said transverse bend component.

* * * * *